United States Patent
Toltsch et al.

(10) Patent No.: US 10,696,764 B2
(45) Date of Patent: Jun. 30, 2020

(54) PROCESS FOR PREPARING PROPYLENE COPOLYMERS

(71) Applicant: BOREALIS AG, Vienna (AT)

(72) Inventors: Wilfried Toltsch, Marchtrenk (AT); Luigi Resconi, Neuhofen an der Krems (AT)

(73) Assignee: BOREALIS AG (AT)

( * ) Notice: Subject to any disclaimer, the term of this patent is extended or adjusted under 35 U.S.C. 154(b) by 310 days.

(21) Appl. No.: 15/538,899

(22) PCT Filed: Dec. 28, 2015

(86) PCT No.: PCT/EP2015/081290
§ 371 (c)(1),
(2) Date: Jun. 22, 2017

(87) PCT Pub. No.: WO2016/107847
PCT Pub. Date: Jul. 7, 2016

(65) Prior Publication Data
US 2017/0335035 A1    Nov. 23, 2017

(30) Foreign Application Priority Data
Dec. 31, 2014   (EP) .................... 14200692

(51) Int. Cl.
*C08F 210/06*   (2006.01)
*C08J 5/18*     (2006.01)

(52) U.S. Cl.
CPC .............. *C08F 210/06* (2013.01); *C08J 5/18* (2013.01); *C08J 2323/14* (2013.01)

(58) Field of Classification Search
None
See application file for complete search history.

(56) References Cited

U.S. PATENT DOCUMENTS

| | | | | |
|---|---|---|---|---|
| 6,303,532 | B1 * | 10/2001 | Garoff | C08F 10/00 502/102 |
| 8,304,049 | B2 * | 11/2012 | Machl | C08L 23/10 264/209.1 |
| 2012/0184694 | A1 * | 7/2012 | Xia | C07F 3/003 526/124.2 |

FOREIGN PATENT DOCUMENTS

| | | |
|---|---|---|
| CN | 102372804 A | 3/2012 |
| EP | 0426139 A2 | 5/1991 |
| EP | 0501741 B1 | 4/1996 |
| EP | 0752431 A2 | 1/1997 |
| EP | 0773235 B1 | 5/1999 |
| EP | 0250229 B2 | 10/2002 |
| EP | 1197497 B1 | 9/2009 |
| EP | 2586801 B1 | 12/2014 |
| WO | 2006104297 A1 | 10/2006 |
| WO | 2009077287 A1 | 6/2009 |

OTHER PUBLICATIONS

Collina, G., et al., "Propene-Co-Butene Random Copolymers Synthesized With Superactive Ziegler-Natta Catalyst", Journal of Molecular Catalysis A: Chemical 99 (1995) 161-165.
Office Action for Chinese Application No. 201580066584.5, dated Feb. 27, 2019.

* cited by examiner

*Primary Examiner* — Catherine S Branch
(74) *Attorney, Agent, or Firm* — Tarolli, Sundheim, Covell & Tummino LLP

(57) ABSTRACT

The present invention relates to an olefin polymerization process, wherein propylene and 1-butene and optionally ethylene are reacted in the presence of a Ziegler-Natta catalyst system so as to obtain a polypropylene, wherein the polypropylene comprises 1-butene-derived comonomer units in an amount of from 0.5 to 15 wt % and optionally ethylene-derived comonomer units in an amount of up to 3 wt %, and the Ziegler-Natta catalyst system comprises an external donor of the formula (I)

$(R^3)_z(R^2O)_ySi(R^1)_X$    (I).

11 Claims, No Drawings

PROCESS FOR PREPARING PROPYLENE COPOLYMERS

The present invention relates to an olefin polymerization process, wherein propylene and 1-butene and optionally ethylene are reacted in the presence of a Ziegler-Natta catalyst system comprising an external donor.

It is known that polypropylene comprising comonomer units derived from a higher alpha-olefin (such as 1-butene or 1-hexene) and optionally ethylene-derived comonomer units is useful for preparing polypropylene films such as cast, BOPP and blown films. Among other articles, flexible packaging can be prepared from such polypropylene materials.

A polypropylene having comonomer units of a higher alpha-olefin (e.g. a $C_{4-10}$ alpha-olefin) and optionally ethylene comonomer units (i.e. a terpolymer if $C_2$ comonomer units are present as well) can be prepared in the presence of a Ziegler-Natta catalyst system. However, for the preparation process to be efficient, it is important that the catalyst system has a high reactivity for the $C_{4-10}$ alpha-olefin used as comonomer. Drawbacks arising from a low reactivity for the $C_{4-10}$ alpha-olefin comonomer are e.g. increasing amounts of the alpha-olefin comonomer that are needed for introducing a certain amount of higher alpha-olefin comonomer units into the polymer and/or removal of non-reacted higher alpha-olefin from the polymer powder.

Typically, ethylene is of higher reactivity than a $C_{4-10}$ alpha-olefin. So, in particular for the preparation of propylene terpolymers having comonomer units derived from a higher alpha-olefin and from ethylene, it is very important that the used catalyst system has a sufficiently high reactivity for the $C_{4-10}$ alpha-olefin component.

Depending on the final application, the polypropylene needs to be subjected to further process steps such as extrusion or moulding (e.g. cast moulding, blow moulding, etc.). For these processing steps, the polypropylene should have good processability (as indicated e.g. by a sufficiently high melt flow rate). Furthermore, the polypropylene should have product properties which are consistent with the intended final application. Just as an example, if the polypropylene shall be used for preparing food packaging, it is preferred to keep the amount of xylene solubles on a sufficiently low level. So, a catalyst system should comply with both requirements, i.e. having a high reactivity for a specific $C_{4-10}$ alpha-olefin comonomer and enabling the preparation of a $C_3/C_{4-10}$ copolymer, and optionally a $C_3/C_{4-10}/C_2$ terpolymer, having properties, especially low xylene solubles, which are consistent with the intended use.

Use of alkoxy silane type compounds as external donor in propylene (co)polymerization is as such known and described in patent literature, especially when high stereospecific polypropylenes, in particular propylene homopolymers, are desired. E.g. EP0250229, WO2006104297, EP0773235, EP0501741 and EP0752431 disclose specific alkoxy silanes for polymerizing propylene.

WO 2009/077287 A1 describes a process for the preparation of polypropylene comprising 1-hexene derived comonomer units. Such C3/C6 copolymers can be used for preparing blown films (e.g. in food packaging applications). The C3/C6 copolymer can be prepared in the presence of a Ziegler-Natta catalyst comprising an external donor such as thexyltrimethoxysilane. However, the process described in WO 2009/077287 A1 results in a polypropylene having a high amount of xylene solubles. In a comparative example of WO 2009/077287 propylene-butene copolymer with 15 wt-% of butene (MFR 0.8 g/10 min) were used in film preparation. No process, catalyst or other polymer details are given for the polymers used in comparative film products.

G. Collina, L. Noristi, C. A. Stewart, J. Mol. Cat. A: Chem. 1995, 99, 161-165, discloses studies of stereospecificity of homo- and propylene-co-butene copolymers synthetized by using specific silanes as external donors. In the two copolymer examples xylene solubles are high with comonomer content below 10 wt %. If alkoxy silanes are disclosed to be used in propylene copolymerization, high XS values, or high comonomer incorporation have not been of any concern. I.e. low XS values and at the same time high comonomer incorporation is not disclosed in prior art documents.

It is an object of the present invention to provide a process for preparing a polypropylene comprising comonomer units derived from a higher alpha-olefin, especially 1-butene, and optionally from ethylene, wherein the 1-butene comonomer is incorporated into the polymer chain at high yield while still providing a polypropylene with low xylene solubles (XS) values and having properties which are consistent with the intended use (e.g. as a packaging material).

According to a first aspect of the present invention, the object is an olefin polymerization process, wherein propylene and 1-butene and optionally ethylene are reacted in the presence of a Ziegler-Natta catalyst system so as to obtain a polypropylene,
wherein the polypropylene comprises 1-butene-derived comonomer units in an amount of from 0.5 to 15 wt % and optionally ethylene-derived comonomer units in an amount of up to 3 wt %, and the Ziegler-Natta catalyst system comprises an external donor of the formula (I)

wherein
x is 1; y is 2 or 3; and z is 0 or 1; under the provision that x+y+z=4;
$R^1$ is an organic residue of the following formula (II)

wherein
the carbon atom C bonded to the Si atom is a tertiary carbon atom and each of the residues $R^4$, $R^5$ and $R^6$ bonded to the tertiary carbon atom is, independently from each other, a linear $C_{1-4}$ alkyl, or two of $R^4$, $R^5$ and $R^6$, together with the tertiary carbon atom C they are attached to can be part of a carbocycle of 4-10 carbon atoms;
$R^2$ is a linear $C_{1-4}$ alkyl;
$R^3$ is linear $C_{1-4}$ alkyl, preferably methyl or ethyl.

In the present invention, it has been realized that 1-butene can be very efficiently incorporated into the polymer chain, and still achieving desirable product properties such as low XS for propylene-1-butene copolymer, when a Ziegler-Natta catalyst system containing an external donor of formula (I) as specified above is used. According to the process of the invention 1-butene is incorporated efficiently into the polymer chain also in the presence of ethylene monomer. As will be discussed below in further detail, a Ziegler-Natta catalyst system comprising the specific silane compound of formula (I) acting as an external donor has a very high reactivity for 1-butene. Thus, less 1-butene has to be fed to the polymerization reactor for accomplishing a certain content of 1-butene-derived comonomer units in the final polymer and/or less non-reacted 1-butene has to be removed from the polymer powder.

In a preferred embodiment of formula (I), y is 3, i.e. one $R^1$ residue and three $R^2O$ residues, which can be the same or different, are bonded to the Si atom. According to another preferred embodiment, x is 1, y is 2 and z is 1.

Preferably, y is 3 (and therefore z=0), $R^2$ is a linear $C_{1-4}$ alkyl, preferably methyl or ethyl, $R^4$, $R^5$ and $R^6$ are methyl or ethyl. More preferably, y is 3, $R^2$ is methyl or ethyl, and $R^4$, $R^5$ and $R^6$ are methyl.

According to another preferred embodiment y is 3, $R^2$ is methyl, $R^4$, $R^5$ and $R^6$ are methyl.

According to another preferred embodiment y is 3, $R^2$ is ethyl, $R^4$, $R^5$ and $R^6$ are methyl.

According to another preferred embodiment y is 2, z is 1, $R^2$ is methyl or ethyl, $R^3$ is methyl or ethyl, and $R^4$, $R^5$ and $R^6$ are methyl.

As indicated above, the polypropylene prepared according to the method of the invention comprises 1-butene-derived comonomer units in an amount of from 0.5 to 15 wt %. Preferably, the amount of 1-butene-derived comonomer units in the polypropylene is from 1 wt % to 12 wt %, even more preferably from 2 wt % to 10 wt %, in particular 2 wt % to 9 wt %. In some preferred embodiments 1-butene content may be in the range of 3 wt % to 10 wt %, 4 wt % to 10 wt %, 3 wt % to 9 wt %, or 4 wt % to 9 wt %.

Low XS values are desired, and thus, XS values at most 3 wt-% are preferred, when only 1-butene is used as comonomer. In case ethylene is used as additional comonomer, XS values tend to be higher.

The polypropylene prepared in the process of the present invention can be a copolymer containing the 1-butene-derived comonomer units but no other comonomer units, such as ethylene-derived comonomer units or comonomer units derived from a $C_{5-10}$ alpha-olefin.

As already mentioned above, 1-butene is still very efficiently incorporated into the polymer chain even if ethylene as a further comonomer is present. So, the polypropylene prepared in the process of the present invention may contain ethylene-derived comonomer units in an amount of up to 3 wt %, more preferably 0.5 wt % to 2.5 wt %.

In another preferred embodiment, the polypropylene prepared in the process of the present invention is a terpolymer comprising 1-butene-derived comonomer units in an amount of from 0.5 wt % to 15 wt %, preferably from 1 wt % to 12 wt %, more preferably 2 wt % to 10 wt %, even more preferably from 2 wt % to 9 wt %, in particular from 3 wt % to 9 wt % and ethylene-derived comonomer units in an amount of up to 3 wt %, more preferably from 0.5 wt % to 2.5 wt %. Thus, according to one preferred embodiment the polypropylene prepared in the process of the present invention is a propylene terpolymer comprising 1-butene-derived comonomer units in an amount of from 1 wt % to 12 wt % and ethylene-derived comonomer units in an amount of from 0.5 wt % to 2.5 wt %, preferably 1-butene-derived comonomer units in an amount of from 2 wt % to 10 wt % and ethylene-derived comonomer units in an amount of from 0.5 wt % to 2.5 wt % and in one embodiment 1-butene-derived comonomer units in an amount of from 3 wt % to 9 wt % and ethylene-derived comonomer units in an amount of from 0.5 wt % to 2.5 wt %. As the term "terpolymer" implies, apart from propylene-derived monomer units and comonomer units derived from 1-butene and ethylene, no other comonomer units are present in said terpolymer.

In general, process conditions for providing desired comonomer content in the final polymer are commonly known to the skilled person or can easily be established on the basis of common general knowledge.

As already mentioned above, using the specific silane compound of formula (I) as external donor in combination with 1-butene as the higher alpha-olefin comonomer does not only result in a very efficient comonomer incorporation but also makes accessible a polypropylene having beneficial product properties.

Preferably, the polypropylene has a melt flow rate $MFR_2$ of from 0.5 to 100 g/10 min, more preferably 1.0 to 30 g/10 min.

In a preferred embodiment, the polypropylene has a melt flow rate $MFR_2$ of from 3.0 to 20 g/10 min, more preferably 5.0 to 15 g/10 min. These $MFR_2$ values are in particular useful for preparing a cast or biaxially oriented polypropylene (BOPP) film.

According to another preferred embodiment, the polypropylene has a melt flow rate $MFR_2$ of from 0.5 to 5.0 g/10 min, more preferably 1.0 to 4.0 g/10 min or even from 1.0 to 3.0 g/10 min. These $MFR_2$ values are in particular useful for preparing a blown film.

Propylene-butene copolymer prepared according to the process of the invention have XS values at most 3 wt-%, especially in the range of 1.0 to 3 wt-%, preferably 1.5 to 2.7 wt. Propylene-butene-ethylene terpolymers prepared according to the process of the invention have typically higher XS values compared to polymers having only propylene and butene monomer units. XS values up to 10 wt-%, are possible, preferably XS is in the range of 2 to 7 wt-% for propylene-butene-ethylene terpolymers.

Apart from the specific external donor defined above, a Ziegler-Natta catalyst system as commonly known to the skilled person can be used in the present invention.

Preferably, the Ziegler-Natta catalyst system comprises a solid Ziegler-Natta procatalyst and an organometallic cocatalyst. These catalyst components are generally known to the skilled person. Typically, the Ziegler-Natta procatalyst comprises a titanium compound and optionally an internal donor. As internal donor compound is meant a compound being part of the solid Ziegler-Natta procatalyst. The titanium compound and optionally the internal donor are preferably supported on a solid magnesium compound.

Appropriate internal donors of Ziegler-Natta catalyst systems are generally known to the skilled person and include e.g. ethylbenzoate, phthalic acid mono- or diesters such as a mono- or di-$C_{1-2}$ alkyl phthalate or di-iso-butylphthalate, 1,3-diethers or succinates.

In the Ziegler-Natta catalyst system used in the present invention, the molar ratio of aluminium (from the organometallic cocatalyst) to titanium can vary over a broad range. Preferably, the molar ratio of aluminium to titanium in the Ziegler-Natta catalyst system is from 10 to 1000, more preferably from 50 to 500.

The organometallic cocatalyst may comprise at least one compound selected from a trialkylaluminium, a dialkyl aluminium chloride, an alkyl aluminium sesquichloride, or any mixture thereof. Preferably, alkyl is ethyl or isobutyl, and typically the cocatalyst is a triethyl aluminium.

In the Ziegler-Natta catalyst system of the present invention, the molar ratio of the external donor to titanium (from the Ziegler-Natta procatalyst) can vary over a broad range. Preferably, the molar ratio of the external donor to titanium in the Ziegler-Natta catalyst system is from 1 to 100, more preferably from 5 to 50.

In one preferred embodiment, the internal donor being present in the Ziegler-Natta procatalyst is a trans-esterification product of a $C_{1-2}$ alcohol and a phthalic acid ester.

Ziegler-Natta procatalyst of that type is thus preferably obtainable or obtained by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

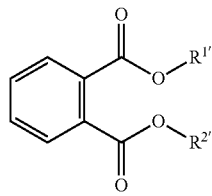

(I)

wherein $R^{1'}$ and $R^{2'}$ are independently an alkyl group having at least 5 carbon atoms, under conditions where a transesterification between said $C_1$ to $C_2$ alcohol and said dialkylphthalate of formula (I) takes place, c) optionally washing the product of stage b) and/or d) optionally reacting the product of step b) or step c) with additional $TiCl_4$.

The polymerization process for the production of the polypropylene may be a continuous process or a batch process utilising known methods and operating in liquid phase, optionally in the presence of an inert diluent, or in gas phase or by mixed liquid-gas techniques. Preferably the process is operated in liquid phase or by mixed liquid-gas techniques.

The polypropylene may be produced by a single- or multistage polymerisation process such as bulk polymerization, gas phase polymerization, slurry polymerization, solution polymerization or combinations thereof using the Ziegler-Natta catalyst system as described above.

Most preferably the polypropylene is made in one or two slurry, preferably loop reactor(s), or in a combination of one or two loop reactor(s) and at least one gas phase reactor. Those processes are well known to one skilled in the art.

If polymerization is performed in one or two loop reactors, the polymerization is preferably carried out in liquid propylene/1-butene mixtures at temperatures in the range from 20° C. to 100° C. Preferably, temperatures are in the range from 60° C. to 80° C. The pressure is preferably between 5 and 60 bar. The molecular weight of the polymer chains and thereby the melt flow rate of the polypropylene, is regulated by adding hydrogen.

The process may also comprise an in-line prepolymerization step. The catalyst can also be pre-polymerized off-line, e.g. with ethylene, propylene, or vinylcyclohexane. The off-line pre-polymerization degree (in gram of polymer per gram of catalyst) can be between 0.5 and 100, preferably between 1 and 50.

The in-line prepolymerization can be conducted as bulk slurry polymerization in liquid propylene or propylene/butene mixtures, i.e. the liquid phase mainly comprises propylene and optionally butene, with minor amount of other reactants and optionally inert components dissolved therein.

The prepolymerization reaction is typically conducted at a temperature of 0 to 50° C., preferably from 10 to 45° C.

If a prepolymerization step is carried out, it is possible that all catalyst components are introduced to the prepolymerization reactor. However, in principle, it is also possible that only a part of the cocatalyst is introduced into the prepolymerization stage and the remaining part into subsequent polymerization stages.

Hydrogen may be added into the prepolymerization stage to control the molecular weight of the prepolymer as is known in the art. Further, an antistatic additive may be used to prevent the particles from adhering to each other or to the walls of the reactor.

The precise control of the prepolymerization conditions and reaction parameters is within the skill of the art.

According to a further aspect, the present invention relates to a polypropylene, which is obtainable by the process as described above.

With regard to the preferred properties of the polypropylene, reference can be made to the statements already made above.

According to a further aspect, the present invention relates to a film, comprising the polypropylene as described above.

Preferably, the film is selected from a blown film, a cast film or a BOPP film.

The film can be oriented, either mono-axially or bi-axially. Alternatively, the film can be non-oriented.

The film can be a layer, more preferably a sealing layer, in a multilayered biaxially oriented polypropylene (BOPP) film. So, according to another preferred embodiment, the present invention provides a multilayered biaxially oriented polypropylene (BOPP) film comprising a sealing layer which comprises the polypropylene as described above.

According to a further aspect, the present invention relates to a process for preparing a polypropylene film, which comprises preparing a polypropylene by the olefin polymerisation process described above, and processing the polypropylene to a film.

The polypropylene can be processed to a film by commonly known methods such as blow moulding, cast moulding, and extrusion moulding.

According to a further aspect, the present invention relates to the use of a Ziegler-Natta catalyst system which comprises an external donor of the following formula (I)

wherein x is 1; y is 2 or 3; and z is 0 or 1; under the provision that x+y+z=4;

$R^1$ is an organic residue of the following formula (II)

(II)

wherein the carbon atom C bonded to the Si atom is a tertiary carbon atom and each of the residues $R^4$, $R^5$ and $R^6$ bonded to the tertiary carbon atom is, independently from each other, a linear $C_{1-4}$ alkyl, or two of $R^4$, $R^5$ and $R^6$, together with the tertiary carbon atom C they are attached to can be part of a carbocycle of 4-10 carbon atoms;

$R^2$ is $C_{1-2}$ alkyl;

$R^3$ is linear $C_{1-4}$ alkyl, preferably methyl or ethyl;

for manufacturing a polypropylene which comprises 1-butene-derived comonomer units in an amount of from 5 to 15 wt % and optionally ethylene-derived comonomer units in an amount of up to 3 wt %.

With regard to the preferred properties of the Ziegler-Natta catalyst system and the polypropylene, reference can be made to the statements provided above.

The present invention will now be described in further detail by the following Examples.

EXAMPLES

I. Measuring Methods

If not otherwise indicated, the parameters mentioned in the present application are measured by the methods outlined below.

1. Comonomer Content by IR Spectroscopy

The 1-butene content of the propylene-butene copolymer was determined by quantitative Fourier transform infrared spectroscopy (FTIR) on films. Thin films were pressed to a thickness of between 260 and 300 μm at 210° C. and spectra recorded in transmission mode. Relevant instrument settings include a spectral window of 5000 to 400 wave-numbers (cm$^{-1}$), a resolution of 2.0 cm$^{-1}$ and 16 scans. The butene content of the propylene-butene copolymers was determined using the baseline corrected peak maxima of a quantitative band at 767 cm$^{-1}$, with the baseline defined from 1945 to 625 cm$^{-1}$. The comonomer content in mol % was determined using a film thickness method using the intensity of the quantitative band $I_{767}$ (absorbance value) and the thickness (T, in cm) of the pressed film using the following relationship:

mol % $C4=(I_{767}/T-1,8496)/1,8233$

In case of a propylene-ethylene-butene terpolymer, the 1-butene content was measured as described above but determined using the baseline corrected peak at 780 cm$^{-1}$-750 cm$^{-1}$ and the ethylene content was determined using the baseline corrected peak at 748 cm$^{-1}$ to 710 cm$^{-1}$, using the following relationships:

mol % $C4=(I_{780-750}/T-3,1484)/1,5555$ mol % $C2=(I_{748-710}/T-0,6649)/1,2511$ 2. Amount of Xylene Solubles (XS, wt-%)

The amount of xylene solubles was determined at 25° C. according ISO 16152; first edition; 2005 Jul. 1.

3. MFR$_2$

Melt flow rate MFR$_2$ was measured according to ISO 1133 (230° C., 2.16 kg load).

4. Melting Temperature

The melting points (T$_m$) were determined on a DSC Q2000 T A Instrument, by placing a 5-7 mg polymer sample, into a closed DSC aluminum pan, heating the sample from −30° C. to 225° C. at 10° C./min, holding for 10 min at 225° C., cooling from 225° C. to −30° C., holding for 5 min at −30° C., heating from −30° C. to 225° C. at 10° C./min. The reported values are those of the peak of the endothermic heat flow determined from the second heating scan II. Polymerization Experiments In the Inventive Examples, the following external donors were used:

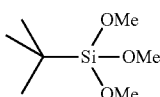

tert-butyl trimethoxy silane, marked in the examples as ID0. CAS no 18395-29-4.

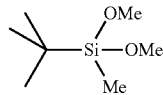

tert-butyl dimethoxy(methyl) silane, marked in the examples as ID3. CAS no 18293-81-7.

In the Comparative Examples, the following external donors were used:

Dicyclopentyldimethoxysilane, marked in the examples as D. CAS no126990-35-0,

Thexyltriethoxysilane, marked in the examples as CD2. CAS no 142877-46-1

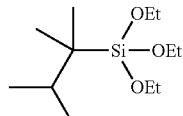

(2 3-dimethylbutan-2-yl) triethoxysilane or Thexyltriethoxy-silane di-tert-butyldimethoxy silane, marked in the examples as CD4. CAS no 79866-98-1

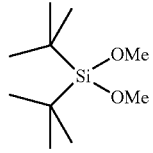

The donors ID0, ID3, CD2 and CD4 were prepared according to the procedures reported in the literature.

The same Ziegler-Natta procatalyst was used in all Examples and was prepared as follows:

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the catalyst was filtered and dried. Catalyst and its preparation concept is described in general e.g. in patent publications EP491566, EP591224 and EP586390. The amount of Ti in the catalyst was 1.9 wt-%.

In all Examples, triethylaluminium (TEA) was used as the organometallic cocatalyst.

Polymerizations have been carried out in a 20-L bench scale reactor. The same Al/Ti and external donor/Ti molar ratios were used in all Examples: Al/Ti=250 mol/mol and external donor/Ti=25 mol/mol. A prepolymerization was carried out at 20° C., and liquid phase copolymerization was carried out at 75° C. Propylene and 1-butene have been fed to the reactor before the catalyst, and treated with 0.5 mmol TEA, in order to remove the remaining traces of impurities. The treated catalyst was fed last by means of a liquid propylene flow. No additional monomers were fed during the polymerization.

Catalyst Preactivation:

In the glovebox a defined amount of solid catalyst was transferred in a 20 ml stainless steel vial, with 10 ml hexane. Then 0.5 mmol triethylaluminium (TEA, 1 molar solution in hexane) was injected in a second steel vial with a total volume of 2 ml. Afterwards 2 mmol TEA+0.25 mmol donor (0.3 molar solution in hexane) were mixed for 5 minutes in a 5 ml syringe and added in the catalyst vial. In the following step, both vials were mounted on the autoclave Polymerization:

A stirred autoclave (double helix stirrer) with a volume of 21.2 dm$^3$ containing 0.2 bar-g propylene was filled with additional 4.33 kg propylene or with 3.45 kg propylene and the chosen amount of 1-butene. After adding 0.5 mmol TEA with 250 g propylene, the chosen amount of hydrogen was added via mass flow controller (MFC). The solution was stirred at 20° C. and 250 rpm. After a total contact time of 5 min between the solid catalyst and the TEA/Donor solution, the catalyst was injected by means of 250 g propylene. Stirring speed was increased to 350 rpm (250 rpm in case of terpolymerization experiments) and pre-polymerization was run for 5 to 6 min at 20° C. The polymerization temperature was then increased to 75° C., and held constant throughout the polymerization.

When producing propylene-butene-ethylene terpolymers, a constant flow of 0.5 g/min of ethylene was fed via MFC throughout the polymerization in order to achieve the target ethylene concentration in the resultant polymer (in Comparative Example 6 and Inventive examples 4 and 5). For these experiments the reactor pressure was kept constant by adding propylene via mass flow controller. The polymerization time was measured starting when the temperature reached 73° C. After 1 hour the reaction was stopped by adding 5 ml methanol, cooling the reactor and flashing the volatile components.

After flushing the reactor twice with N2 and one vacuum/N2 cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

The polymerization conditions/results are shown in Tables 1, 2, 3 and 4.

TABLE 1

Polymerization conditions in propylene-butene polymerization

| Example | External donor | Catalyst Amount mg | average calculated C4/(C3 + C4) weight ratio in liquid phase wt-% | H2 NL |
|---|---|---|---|---|
| InvEx1 | ID0 | 24.2 | 22.96 | 12 |
| InvEx2 | ID0 | 24.8 | 20.59 | 12 |
| InvEx3 | ID3 | 25.0 | 23.08 | 12 |
| CompEx1 | D | 24.6 | 24.68 | 27 |
| CompEx2 | D | 24.1 | 27.96 | 27 |
| CompEx3 | D | 24.9 | 34.97 | 27 |

TABLE 1-continued

Polymerization conditions in propylene-butene polymerization

| Example | External donor | Catalyst Amount mg | average calculated C4/(C3 + C4) weight ratio in liquid phase wt-% | H2 NL |
|---|---|---|---|---|
| CompEx4 | CD4 | 24.0 | 18.03 | 12 |
| CompEx5 | CD2 | 25.0 | 22.81 | 6 |

TABLE 2

Polymer properties of propylene-butene copolymers

| Example | External Donor | total MFR$_2$ g/10 min | C4 (IR) wt % | XS wt % | T$_m$ ° C. |
|---|---|---|---|---|---|
| InvEx1 | ID0 | 7.7 | 6.1 | 2.1 | 148.5 |
| InvEx2 | ID0 | 4.4 | 5.3 | 2.1 | 150.3 |
| InvEx3 | ID3 | 7.7 | 6.8 | 2.4 | 147.0 |
| CompEx1 | D | 9.0 | 6.1 | 2.3 | 147.3 |
| CompEx2 | D | 8.8 | 6.6 | 2.4 | 146.7 |
| CompEx3 | D | 11 | 8.7 | 3.0 | 142.9 |
| CompEx4 | CD4 | 1.8 | 5.0 | 3.9 | 150.1 |
| CompEx5 | CD2 | 12.3 | 7.2 | 6.7 | 144.5 |

TABLE 3

Propylene-1-butene-ethylene polymerisation conditions

| Example | External donor | Catalyst amount mg | Average calculated C4/(C4 + C3) weight ratio in liquid phase wt % | C2 feed g | Total H2 in bulk NL |
|---|---|---|---|---|---|
| InvEx4 | ID0 | 25.5 | 21.0 | 30 | 12 |
| InvEx5 | ID3 | 24.0 | 21.0 | 30 | 12 |
| CompEx6 | D | 25.5 | 21.8 | 30 | 12 |

TABLE 4

Polymer properties of propylene-1-butene-ethylene terpolymers

| Example | External donor | MFR$_2$ g/10 min | C4 total (IR) wt % | C2 total (IR) wt % | XS wt % | Tm ° C. |
|---|---|---|---|---|---|---|
| InvEx4 | ID0 | 5.3 | 6.3 | 1.2 | 3.5 | 140.5 |
| InvEx5 | ID3 | 7.9 | 7.5 | 1.1 | 4.1 | 140.2 |
| CompEx6 | D | 3.6 | 5.5 | 0.9 | 2.8 | 143.9 |

When evaluating a catalyst for its copolymerization performance, the most useful parameter to determine is the relative comonomer reactivity ratio R, which is defined by:

$$R = \frac{\left(\frac{C_4}{C_3}\right)_{polymer}}{\left(\frac{C_4}{C_3}\right)_{liq.phase}}$$

R is specific for a given catalyst, monomer pair and temperature. As liquid phase composition values, the average of the initial and final calculated values was used.

The values of R determined for propylene-1-butene polymerisations with the Ziegler-Natta catalyst system comprising external donor D (R=0.18-0.19) and the Ziegler-Natta catalyst system comprising external donor ID0 or ID3 (R=0.22 to 0.24) show that the external donor of the present invention increases the 1-butene reactivity of the Ziegler-Natta catalyst system and still the XS value is low. In comparative example 5 R is on the same level as in inventive examples, however, XS values are clearly higher than in inventive examples. In comparative examples 1 to 3 XS values are on the same level as in the inventive examples, but the R values are lower, i.e. 1-butane reactivity of the inventive examples is higher.

So, as demonstrated above, the Ziegler-Natta catalyst system comprising the external donor of the present invention has a very high reactivity for 1-butene, thereby requiring less 1-butene in the monomer feed.

This means that less unreacted 1-butene has to be removed from the final polymer, with the operability advantage of reducing the degassing time, resulting in a higher throughput.

The invention claimed is:

1. An olefin polymerization process comprising: reacting propylene and 1-butene and ethylene in the presence of a Ziegler-Natta catalyst system so as to obtain a polypropylene, which is a 1-propylene-1-butene-ethylene terpolymer,
   wherein the polypropylene comprises 1-butene-derived comonomer units in an amount of from 0.5 to 15 wt % and ethylene-derived comonomer units in an amount of up to 3 wt %, and
   the Ziegler-Natta catalyst system comprises an external donor of the following formula (I):

$$(R^3)_z(R^2O)_ySi(R^1)_x \qquad (I)$$

wherein
   x is 1; y is 2; and z is 1; under the provision that x+y+z=4;
   $R^1$ is an organic residue of the following formula (II):

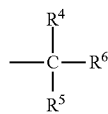

(II)

wherein
   the carbon atom C bonded to the Si atom is a tertiary carbon atom and each of the residues $R^4$, $R^5$ and $R^6$ bonded to the tertiary carbon atom is, independently from each other, a linear $C_{1-4}$ alkyl, or two of $R^4$, $R^5$ and $R^6$, together with the tertiary carbon atom C they are attached to can be part of a carbocycle of 4-10 carbon atoms;
   $R^2$ is a linear $C_{1-4}$ alkyl;
   $R^3$ is linear $C_{1-4}$ alkyl; and
   wherein the process is operated in liquid phase or by mixed liquid-gas techniques.

2. The process according to claim 1, wherein $R^4$, $R^5$, $R^6$ are methyl, $R^2$ is methyl or ethyl and $R^3$ is methyl or ethyl.

3. The process according to claim 1, wherein, $R^4$, $R^5$ and $R^6$ are methyl and $R^2$ is methyl.

4. The process according to claim 1, wherein the polypropylene does not comprise any monomer units derived from a $C_{5-10}$ alpha-olefin.

5. The process according to claim 1, wherein the amount of 1-butene-derived comonomer units in the polypropylene is 1 to 12 wt %.

6. The process according to claim 1, wherein the 1-butene content is 1 to 12 wt %, and ethylene content is 0.5 to 2.5 wt %.

7. The process according to claim 1, wherein the $MFR_2$ of the propylene polymer is in the range of 0.5 to 100 g/10 min.

8. The process according to claim 1, wherein the Ziegler-Natta catalyst system comprises:
   a Ziegler-Natta procatalyst comprising a titanium and a magnesium compound, and
   an organometallic cocatalyst comprising an aluminum compound.

9. The process according to claim 1, wherein the molar ratio of aluminum to Ti in the Ziegler-Natta catalyst system is from 10 to 1000; and/or the molar ratio of the external donor to Ti in the Ziegler-Natta catalyst system is from 1 to 100.

10. The process according to claim 1, wherein the Ziegler-Natta procatalyst is obtained by:
    a) reacting a spray crystallized or emulsion solidified adduct of $MgCl_2$ and a $C_1$-$C_2$ alcohol with $TiCl_4$
    b) reacting the product of stage a) with a dialkylphthalate of formula (I):

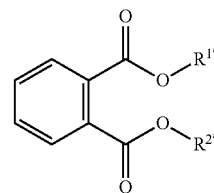

(I)

wherein $R^{1'}$ and $R^{2'}$ are independently an alkyl group having at least 5 carbon atoms,
under conditions where a transesterification between said $C_1$ to $C_2$ alcohol and said dialkylphthalate of formula (I) takes place;
c) optionally washing the product of stage b) and/or
d) optionally reacting the product of step b) or step c) with additional $TiCl_4$.

11. The process of claim 1, further comprising:
processing the polypropylene to a film.

* * * * *